United States Patent [19]
Glenn et al.

[11] Patent Number: 6,043,825
[45] Date of Patent: Mar. 28, 2000

[54] METHOD OF DISPLAYING 3D NETWORKS IN 2D WITH OUT FALSE CROSSINGS

[75] Inventors: Raymond R Glenn, Harwood; Helaman R Ferguson, Laurel, both of Md.

[73] Assignee: The United States of America as represented by the National Security Agency, Washington, D.C.

[21] Appl. No.: 08/879,277

[22] Filed: Jun. 19, 1997

[51] Int. Cl.[7] .................................................. G06T 17/00
[52] U.S. Cl. ...................... 345/440; 345/419; 395/200.54
[58] Field of Search .................................... 345/440, 419; 395/200.54

[56] References Cited

U.S. PATENT DOCUMENTS

| | | | |
|---|---|---|---|
| 5,515,487 | 5/1996 | Beaudet et al. | |
| 5,751,931 | 5/1998 | Cox et al. | 395/140 |
| 5,767,861 | 6/1998 | Kimura | 345/473 |
| 5,821,941 | 10/1998 | Millstein | 345/420 |

OTHER PUBLICATIONS

Richard A. Becker, et al., "Dynamic Graphs for Network Visualization," *Proceedings of the First IEEE Conference on Visualization, Visulaization'90'*, pp. 93–96.

*Primary Examiner*—Mark K. Zimmerman
*Assistant Examiner*—Mano Padmanabhan
*Attorney, Agent, or Firm*—Robert D. Morelli

[57] ABSTRACT

A method of displaying on a computer screen a two dimensional representation without any false crossings of a three dimensional interconnection network, where the three dimensional interconnection network consists of vertices defined by a series of perpendicular quadrilaterals; where the vertices of the quadrilaterals are mapped onto a two dimensional hyperbolic plane using geometric functions based on the vertex chosen as a point of origin and where the vertices in the two dimensional display are labelled along with any performance data.

7 Claims, 6 Drawing Sheets

Microfiche Appendix Included
(3 Microfiche, 132 Pages)

METHOD OF DISPLAYING 3D NETWORKS IN 2D WITH OUT FALSE CROSSINGS

FIELD OF THE INVENTION

The present invention relates to computer graphics and, more particularly, to representation of three-dimensional networks in two-dimensions without false line crossings.

BACKGROUND OF THE INVENTION

One of the latest advances in computer technology has been the development of parallel multiprocessor networks, consisting of many processing nodes interconnected in various topological configurations. The advantage of these configurations is that the processing nodes can execute instructions simultaneously, reducing the overall processing time for any program. However, in order to increase the efficiency of the overall system, information and data must be transferred efficiently throughout the whole network configuration. Therefore, the goal in designing such configurations is to obtain the best paths between all the processing nodes. This has resulted in increasingly complex network configurations.

To help increase the overall system performance, software system routines are implemented across the processing node configurations. These routing algorithms are designed to reduce data contention and imbalancing, and are responsible for moving data across the node configuration.

In order to develop routing routines for each configuration, each routing routine must be tested and analyzed. Processor node performance must be analyzed because the efficiency of a routing routine is reflected by individual node performance. The best measure of efficiency is the dynamic analysis of individual node performance during the actual execution of software programs.

Presently, analysis is done by static routines that accrue information while the system is executing. Then after the execution is completed these routines generate statistical tables with overall node performance.

Graphic representations can help make the network more understandable by helping the user visualize the structure. Generally, the network configuration is depicted as wire diagrams or graphs. That is, the processing nodes are represented as graph vertices, while arcs connecting the vertices represent the actual physical wires connecting the nodes. For example, a three dimensional cube would be represented with vertices at each corner and arcs connecting the vertices revealing the sides of the cube in a frame-like structure. However, even in a simple cube configuration, any two dimensional representation would prohibit the viewer from discerning which nodes are physically connected with each other. The most common technique employed in computer graphics is a direct mapping of the three dimensional structure by projecting the z-axis onto the two dimensional display. The resultant display would show many false intersecting lines between the vertices immediately facing the viewer. The intersecting lines in the two dimensional display that do not intersect at a processing node are called false crossings.

For example, in a three dimensional representation of a cubic toroidal configuration, many of the nodes and lines are in the interior of the cube. A two dimensional representation would flatten the cube and cause the interior nodes to appear as if they were on the exterior edge. The viewer could become confused because the lines connecting the interior vertices would intersect the lines that connect the exterior vertices, thus deceiving the viewer of its spatial orientation.

In addition, in toroidal networks, there are no "exterior edge" nodes in the system. Each individual node has the same number of connecting lines and nearest neighbor nodes. Actual drawings of the network would show arcs that wrap around the display, adding to the complexity and confusion. Therefore, when displaying such configurations on screen or on paper, representations in either two or three dimensions do not reveal these arcs. Users must remember that arcs connect vertices on the left side of the cube to the vertices on the right, and vertices in the front to the vertices in the back.

Another problem with the two dimensional representation is that labelling the nodes for dynamic performance and statistical analysis is nearly impossible. Since current methods of representation make it difficult to discriminate the interior vertices, adding a label to indicate node identification or performance would further the congestion and confusion of viewing the overall network.

Network performance is an important factor in network design research and development. Achieving higher computational throughput requires using efficient loading and routing routines. Dynamically analyzing individual node performance is imperative to properly address problems of data coherency resulting from data bottlenecking and load imbalance.

Very little has been done in the way of performance analysis through dynamic graphic visualization of three dimensional networks in two dimensions.

One previous approach was to selectively display portions of the graph or network. U.S. Pat. No. 5,515,487 describes a method of selectively pruning desired portions of a graph or plurality of graphs while retaining information concerning the nodal interconnections. This method also can delete or hide specified nodes to create a skeletal representation. This method does suffer some drawbacks. First, all false crossings are not eliminated. The number of false arc crossings would depend upon the size of the portion selected to be displayed. As a result, this method would only be effective when displaying a relatively small number of nodes; even then, there is no guarantee of eliminating crossings. In addition, this method requires that the user know ahead of time what areas of the graph to select. Analysis of the network on whole would be difficult.

Another approach is described in the article, "Dynamic Graphs for Network Visualization", by Richard A. Becker, et al. (*Proceedings of the First IEEE Conference on Visualization, Visualization '90*, pg. 93–6). This method would only draw the arcs whose corresponding vertex performance statistics fall above or below a predetermined threshold. However, false crossings in congested areas of the network would not be eliminated. The article further describes dynamic methods of identifying areas of a network and activating or deactivating specific nodes. Again, this does not address the problem of false arc crossings nor does it provide an efficient method of eliminating the visual congestion of the whole network.

The present invention eliminates false crossings in the above methods by displaying three dimensional networks that create a hyperbolic projection in two dimensions which eliminates all false crossings.

MICROFICHE APPENDIX

All computer programs necessary to make and use the present invention are included in a microfiche appendix that has been submitted with this specification to the United States Patent and Trademark Office. The microfiche appendix consists of 3 sheets and a total of 132 frames.

SUMMARY OF THE INVENTION

It is an object of the invention to display on a computer screen in two dimensions the vertices of a three dimensional computer interconnection network and the associated arcs of those vertices.

It is another object of the invention to represent the network of vertices and arcs by creating the display on the computer screen as a hyperbolic projection.

It is another object of the invention to create the hyperbolic projection of the network layout without false crossings of the arcs representing connections between the vertices.

It is another object of the invention to display the dynamic performance statistics associated with the vertices within the two dimensional hyperbolic projection display.

It is another object of the invention to allow the user to dynamically select any vertex to be positioned at the center of the two dimensional display and automatically update the display showing the network from the chosen vertex's perspective.

The present invention presents an efficient method for transforming and displaying the dynamic performance of three dimensional interconnection network in a two dimensional graphical display by eliminating the false crossings that normally occur in such transformations. In addition, the present invention allows the user to dynamically select any node of the network to be the node of reference positioned at the center of the graphical display.

The basis of the present invention is the projection of the nodes and links of an interconnection network onto a hyperbolic plane using mathematical transformations. The objects of this invention are achieved on uniformly structured interconnection networks. The most common uniformly structured interconnection network is a toroid.

The common feature of a toroid is that each node in the three dimensional network is configured alike with six links connecting to neighboring nodes, two for each of the three cartesian directions. Three dimensional representations of these networks are usually visually displayed as a cube or donut shaped image.

The present invention is a method embodied in four computer software modules interacting with each other to create and maintain the two dimensional display. The computer modules include a quadrilateral generator module, a data points module, a direction vectors module, and a real-time graphics and Graphics User Interface (GUI) module.

The quadrilateral generator module defines the three dimensional network as a series of quadrilaterals. A quadrilateral is a four-sided polygon represented by a vertex at each corner with arcs connecting the vertices.

Using quadrilaterals creates an efficient transformation into two dimensions because each quadrilateral is basically a two dimensional slice consisting of four nodes of the three dimensional network. In addition, a quadrilateral accurately represents the actual physical connections between the nodes. All nodes in the three dimensional network are defined in terms of a vertex that is a member in at least one quadrilateral. The most efficient method of creating a complete quadrilateral list is to record the quadrilaterals that are perpendicular with each other. Once all the nodes of the three dimensional network are identified as quadrilateral vertices, then these vertices are mapped onto the two dimensional hyperbolic plane.

The data points module maps the quadrilaterals into cartesian (x,y) coordinates of the hyperbolic plane by mathematically calculating geometric data points using specific transformation functions. These transformation functions create the nearest neighbor data points for each vertex in each quadrilateral. Because of the interconnective nature of toroidal networks, many of the generated data points will be duplicate points created from other vertices. Only those duplicates that are necessary to ensure a uniform display are retained.

In addition to the two dimensional mapping, the data points module creates and maintains an identification label for each vertex.

The direction vectors module maintains eight sets of direction vectors, one for each possible three dimensional surface. These vectors update the two dimensional display when a new vertex is chosen as a point of reference. When a new vertex is chosen, the vectors associated with that vertex enable the graphics module to correctly and efficiently redraw and relabel all of the vertices in the two dimensional display.

The user interacts with the Graphical User Interface (GUI) module which drives the graphics display as a real-time program. The graphics display animates and updates the network on the screen. The display can be dynamically manipulated by either command input or computer mouse controls. The module also reads any performance files associated with the network nodes and displays the performance data with the correct vertex.

The GUI module creates the graphical controls window that contain the attendant control widgets. This real-time process accepts the user input, which includes the vertex as the point of reference in the diagram and the generated data from the other modules to draw the vertices and arcs that make up the quadrilaterals.

If the user changes any parameters in the GUI display then the real-time graphics manager updates the appropriate data for the next drawing cycle.

DETAILED DESCRIPTION OF THE PREFERRED EMBODIMENT

Figure 1:
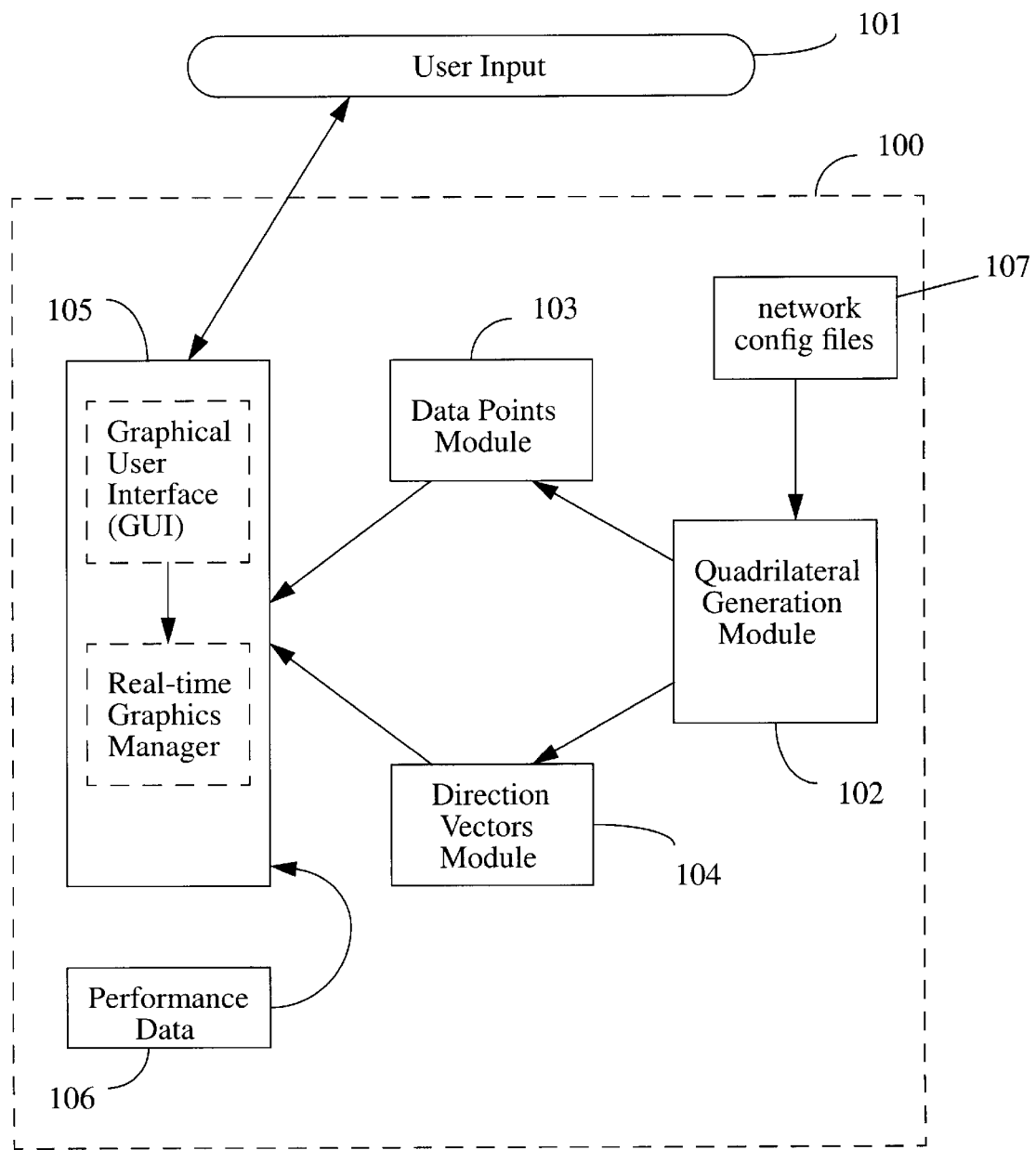
FIG. 1 is a general block diagram of the invention depicting the overall software and hardware module interaction and data flow.

The present invention illustrated in FIG. 1 shows the overall data flow diagram of the process modules and how they interact with each other. The present invention is contained within the computer 100, and is embodied in computer software. Any computer that has an input device, graphical display capability, output device, and an operating system can be used as the computer 100. Various programming modules contained within the computer 100 would allow both user input 101 and system configuration files 107 that include the description of the configuration of the three dimensional interconnection network and a starting node on that network that would be used as a starting point of reference.

The programming modules used in the present invention include a quadrilateral generation module 102, a data points module 103, a direction vectors module 104, and a graphics package with a real-time graphics manager and Graphical User Interface (GUI) 105. Each of these modules are described below.

The initial executing module, the quadrilateral generator module 102, accepts the system configuration files 107 pertaining to the description of the network configuration and the starting node to be used as the initial point of reference. This module defines all the nodes in the three dimensional network through a series of quadrilaterals. A quadrilateral is a four-sided geometric figure with four vertices. Applied to the three dimensional interconnection network, the quadrilateral would be four nodes that are physically connected. To efficiently cover all the nodes in the three dimensional network, the module identifies all quadrilaterals that are perpendicular to each other. For example, for a given three dimensional toroidal network, the quadrilateral generator module 102 generates $1.5*(x*y*z)$ number of perpendicular quadrilaterals, and $x*y*z$ number of vertices where x, y, and z, are the dimensions of the three dimensional network and where "*" denotes multiplication. In perpendicular quadrilaterals, each node in the three dimensional toroidal network would be a vertex for six different perpendicular quadrilaterals. Each perpendicular quadrilateral would contain each of the vertices's nearest neighboring vertices. The result of the quadrilateral generator module 102 is a separate file containing two lists. The first list is of perpendicular quadrilaterals and the four associated vertices that make up each quadrilateral; the other list is of each vertex along with the six perpendicular quadrilaterals associated with that vertex. Further details of the quadrilateral generator module 102 are given below.

The data points module 103 executes after the quadrilateral generator module 102 and utilizes as input the lists created by the quadrilateral generator module 102. The data points module 103 reads the file containing the lists of perpendicular quadrilaterals and vertices and creates two dimensional cartesian coordinates used by the real-time graphics manager and Graphical User Interface module (GUI) 105. The data points module 103 starts by assigning the vertex that was designated by the user input 101 as the data point of reference (0,0) which is placed in the center of the two dimensional graphical display. From this initial starting vertex, the data points module 103 calculates the cartesian coordinates of data points representing the nearest neighboring vertices. The calculation applies two functions to the reference data point coordinate. The number of neighboring vertices generated depend upon the number of perpendicular quadrilaterals associated with each vertex. For example, six neighboring vertices are associated with each vertex in a toroid.

Once the nearest neighbors data points are calculated for the first vertex, the process is continued until all the quadrilaterals and vertices in the lists have been mapped to the two dimensional layout. All the cartesian coordinates and information regarding arcs between the vertices are saved for the real-time graphics manager and Graphical User Interface (GUI) 105. Further details on the data points module 103 are given below.

The direction vectors module 104 uses the network configuration defined as part of the system configuration files 107 and used in the quadrilateral generator module 102 to generate sets of eight vectors for each surface. The direction vectors associated with each surface will be used by the real-time graphics manager 105 to display labels for the vertices in the two dimensional display when the user chooses a new vertex for the point of reference.

The data points module 103 generates the two dimensional cartesian coordinates for each vertex used by the real-time graphics manager 105.

When a user input 101 reflects another vertex to be the point of reference, that vertex will be centered in the two dimensional display and the remaining vertices can be determined and labeled by the set of direction vectors. Further details regarding the direction vectors module 104 are given below.

The real-time graphics manager 105 uses information created in the data points module 103 and direction vectors module 104 to draw the two dimensional display and accepts the user input 101 via the Graphics User Interface (GUI) 105. There are two primary tasks for the real-time graphics manager and GUI module 105. One is setting up the graphics environment and displaying any results on the computer monitor. This is done by the real-time graphics manager. The other task is the dynamic interaction between the user via user input 101 and the algorithm. This task is performed through the GUI. In addition, this module accesses the node performance file 106 and adds the appropriate performance data to the display. The GUI accepts user commands to dynamically change the display by allowing the user input 101 to indicate a new vertex as the point of reference and to be centered in the diagram.

The GUI maintains the graphical controls by interacting with the user via keyboard or mouse commands. Further details regarding the real-time graphics manager and Graphical User Interface (GUI) are given below.

Figure 2:
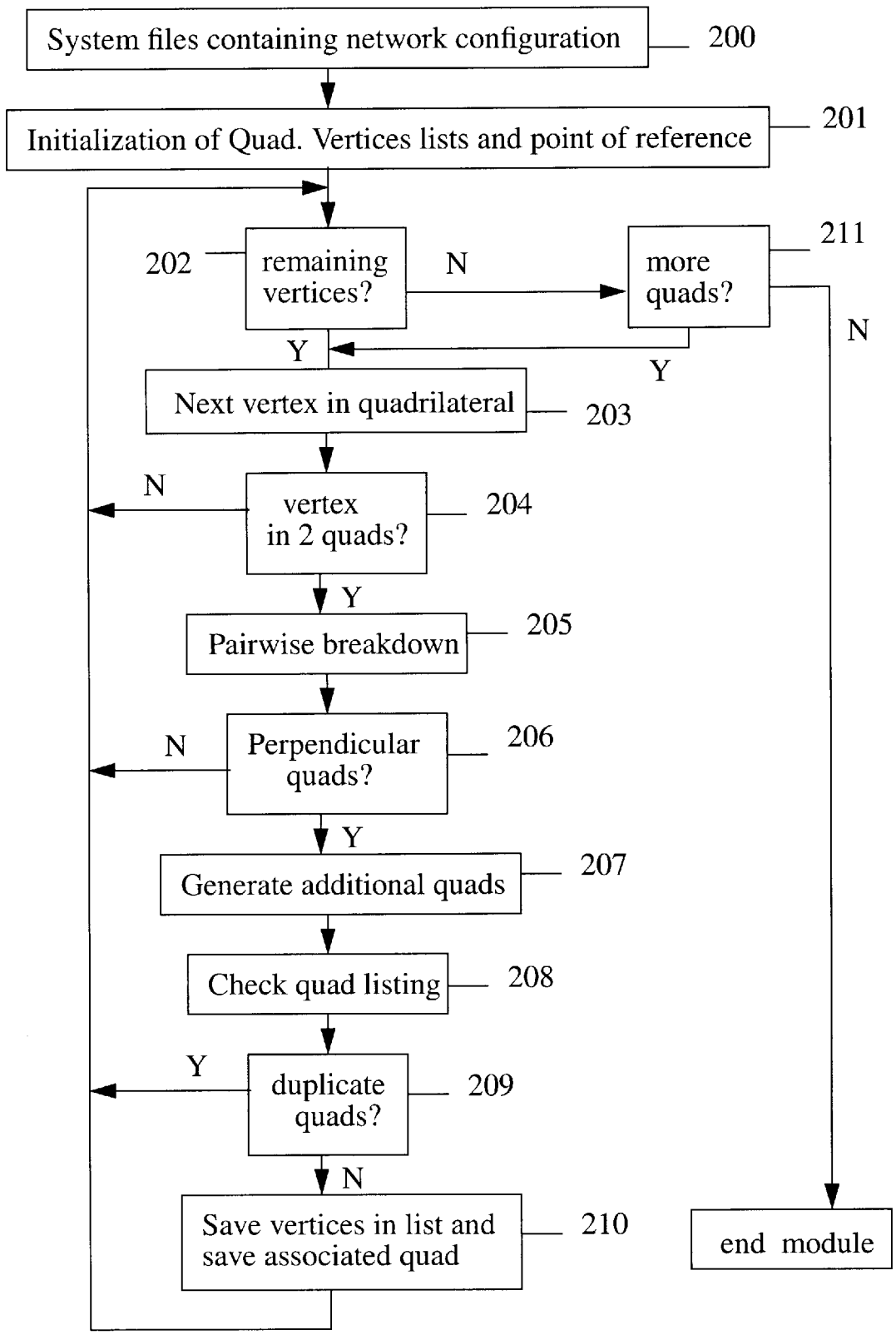
FIG. 2 is a flowchart of the quadrilateral generation module.

FIG. 2 is a flowchart depicting the steps involved in the quadrilateral generation module. In addition, the list of vertices making up the quadrilaterals are also created and maintained by this module. The module starts with input from the user regarding the network configuration, the starting node point of reference, and two initial adjacent perpendicular quadrilaterals. This information is transmitted to the module from system configuration files 200.

The module begins with the three dimensional node chosen as the point of reference and assigns it the coordinate (0,0,0). All other nodes are computed against this initial point of reference. From the initial two perpendicular quadrilaterals and the configuration of the network, given as input, the remaining quadrilaterals and associated vertices are computed. From this point, the module will select each of the vertices in the quadrilateral 202. When all the vertices in one quadrilateral have been selected, then the vertices in next quadrilateral on the quadrilateral list 211 are selected. Once a vertex has been selected 203, it is checked to see if it is common to two quadrilaterals 204. If the vertex is common to two quadrilaterals, then the quadrilaterals are broken down into pair-wise sets of vertices 205. For example, a quadrilateral that has vertices, A:(1,1,1) B:(0,1,1) C:(0,1,0) D:(1,1,0) would be broken down into four sets of pairs: AB, BC, CD, and DA. The next step is to determine whether the quadrilaterals are perpendicular with respect to each other 206. To determine whether two quadrilaterals are perpendicular, the common vertex is subtracted from each of the other two adjacent vertices that make up the pair-wise set, then a dot product is performed on the difference. If the dot product is zero, the quadrilaterals are perpendicular. For example, using the quadrilateral described above and a second quadrilateral that has vertices A:(1,1,1) D:(1,1,0) E:(1,0,0) F:(1,0,1), then the common vertex, A, would be subtracted from adjacent vertices B and F, yielding (−1,0,0)

and (0,−1,0). The dot product of these results is 0; therefore, the two quadrilaterals are perpendicular.

If the quadrilaterals are not perpendicular, the next vertex in the quadrilateral is selected 202. If no more vertices are left in that quadrilateral, the next quadrilateral in the list is selected 211. This procedure of finding all perpendicular quadrilaterals is performed until no new quadrilaterals are uncovered.

If the quadrilaterals are perpendicular, the other perpendicular quadrilaterals associated with the common vertex 207 are identified. For example, for any given vertex in a toroid, there are six (6) associated perpendicular quadrilaterals. Once the first two perpendicular quadrilaterals are found, the other four can be easily generated.

When the other perpendicular quadrilaterals are generated 207, they are checked for duplication against the list of all generated quadrilaterals 208. If the quadrilateral is a duplicate, that quadrilateral is skipped and the next quadrilateral is chosen from the list 209. The checking for duplicates is repeated for all generated quadrilaterals from this process.

Any quadrilateral that is not already on the list is then added 210. In addition to the quadrilaterals, the vertices with their respective addresses and associated quadrilaterals are added to the vertices list file 210.

This process, starting with locating and checking for vertices in adjacent perpendicular quadrilaterals 202 and ending with the adding of new quadrilaterals and vertices to the lists, is performed for all the vertices that are associated with quadrilaterals on the generated lists. This ensures that all of the nodes in the three dimensional interconnection network will be mapped in terms of quadrilaterals and vertices. This module ends when all quadrilaterals and associated vertices are tested.

Figure 3:
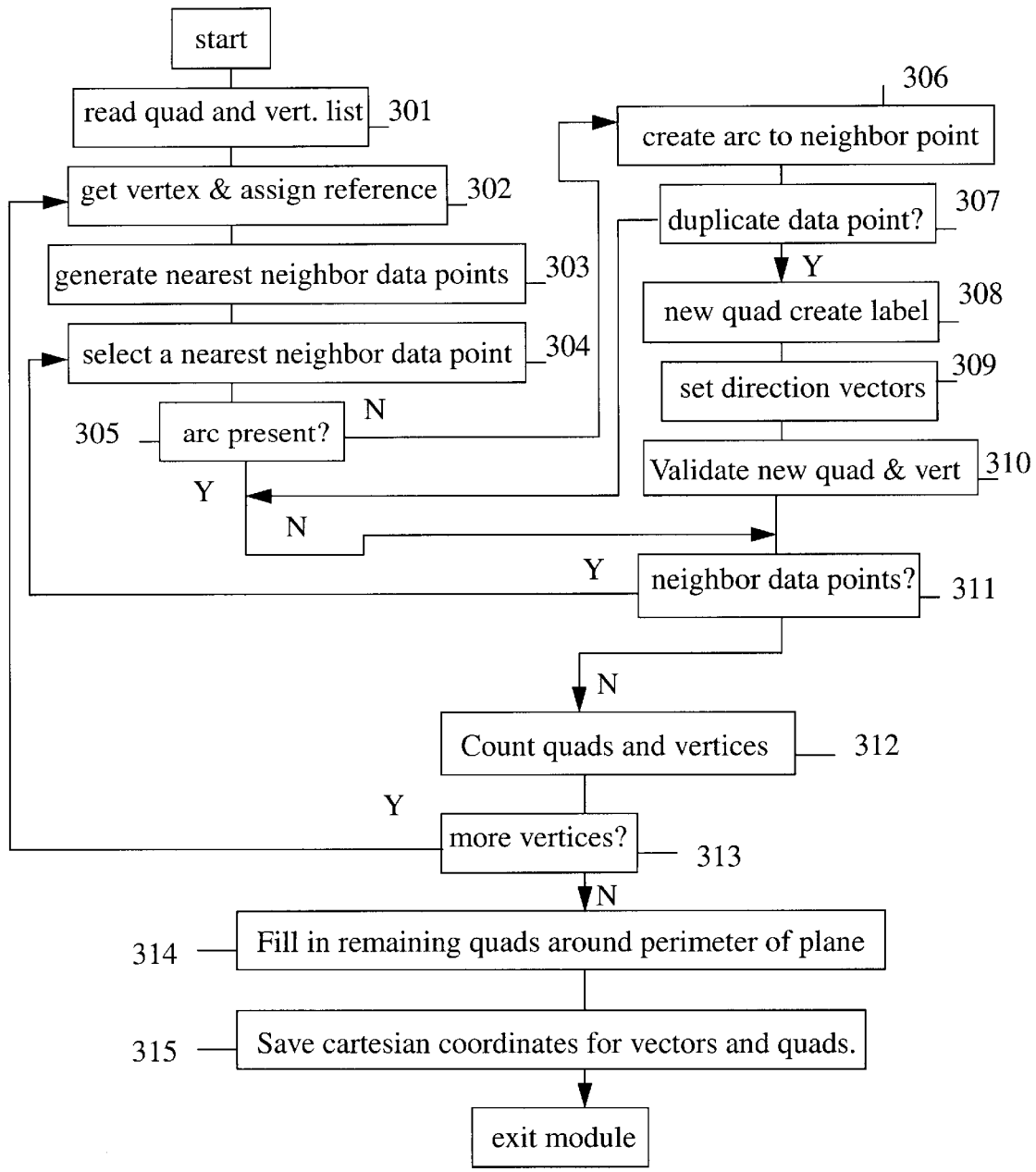
FIG. 3 is a flowchart of the data points module.

FIG. 3 is a flow diagram for the data points module. It generates the cartesian data points to be placed on the two dimensional display represented as a hyperbolic plane. This module reads in the quadrilaterals and vertices lists generated by the quadrilateral generator module 301. It executes until all of the vertices on the list have been represented by a two dimensional cartesian coordinate, or data point, on the hyperbolic plane.

This module starts by selecting a vertex from the input list of quadrilaterals and vertices 302. The vertex is used as a reference for all other vertices in the network. This reference vertex will be displayed at the center of the two dimensional display and assigned as the reference data point (0,0). From this reference data point, a number of nearest neighbor data points are generated using mathematical functions 303. These nearest neighbor data points actually represent the nearest neighbor nodes in the three dimensional network. For example, in a three dimensional toroid, each node is physically connected to six other nodes. Therefore, this module would create six nearest neighbor data points to represent each of the six nearest neighboring nodes. These nearest neighbor data points will be connected with the reference data point by arcs and labelled according to the links in the quadrilateral and vertices lists.

The nearest neighbor data points are generated by the functions $a(w)=(w*sqrt(2)-1)/(w-sqrt(2))$ and $b(w)=(w*(1+i*sqrt(3))/2)$, where $w=x+iy$, and $i=sqrt(-1)$ and where w includes a real value and an imaginary value. The evaluation of the functions $a(w)$ and $b(w)$ at the cartesian coordinate (x,y) yields $(x_a,y_a)$ and $(x_b,y_b)$, respectively. These values of $a(w)$ and $b(w)$ are used to generate the coordinates for the neighboring data points. One data point is $(x_a, y_a)$, which is the result of $a(w)$. All the remaining neighboring data points are $(x_a,y_a)$ multiplied by a series of $(x_b,y_b)$ For example, for a toroid the six nearest neighbor data points are generated by the following function transformations: $a(w)$, $a(w)*b(w)$, $a(w)*b(w)*b(w)$, $a(w)*b(w)*b(w)*b(w)$, $a(w)*b(w)*b(w)*b(w)*b(w)$, $a(w)*b(w)*b(w)*b(w)*b(w)*b(w)$.

After the nearest neighbor data points for the reference data point are calculated, each of the nearest neighbor data points are checked to see if there is an arc from the reference data point to the neighboring point 304 and 305.

A list contains the vertices along with the associated arcs to neighboring vertices. If there is no existing arc to the vertices, one is created and entered onto the list 306. If an arc is already present, then the next neighboring data point is considered using the same procedure to check for arcs between the reference data point and generated nearest neighbor data points 311.

For nearest neighbor data points where an arc was created 306, the neighboring data point is checked to see if it is a duplicate of one already generated 307. If the nearest neighboring data point is a duplicate but the new arc to that data point is not a duplicate, then the nearest neighbor data point represents the fourth vertex of a new quadrilateral.

For each new quadrilateral, the pertinent information about the quadrilateral, vertices, and arcs are filled in by generating new labels for the quadrilateral 308. These labels identify the three dimensional nodes of the quadrilateral and the associated direction vectors of the connecting arcs. The direction vectors to and from the new to the existing quadrilateral vertices will also be set 309. Direction vectors relabel and re-map the three dimensional network nodes to the two dimensional data points when the user changes to a new node as a point of origin. Further explanation of direction vectors are given below. The next step of the module verifies the new quadrilateral and vertices against the current list of quadrilaterals and adds any information to the lists 310.

This process continues until all the quadrilaterals are found and recorded. The total number of quadrilaterals is counted, maintained, and checked against the total number of possible quadrilaterals 312. Once all the nearest neighboring data points are checked, the next vertex on the list is used as the reference data point and its coordinate, calculated earlier as a nearest neighbor data point, is used. The process of generating all of its nearest neighboring data points is continued with the new x and y values 313.

These functions, generating the two dimensional data points, ensure that the generation of a nearest neighbor data points arc does not cross any previously generated arc. This ensures the elimination of any possibility of false crossings in the two dimensional display.

Once all quadrilaterals are listed, the process fills in any blank areas around the edges of the display with duplicate vertices 314. Because of the interconnective structure of the network, certain duplicate vertices will be uniformly displayed on the two dimensional plane.

All the two dimensional data points on the hyperbolic plane will be saved in a separate file 315.

Figure 4:
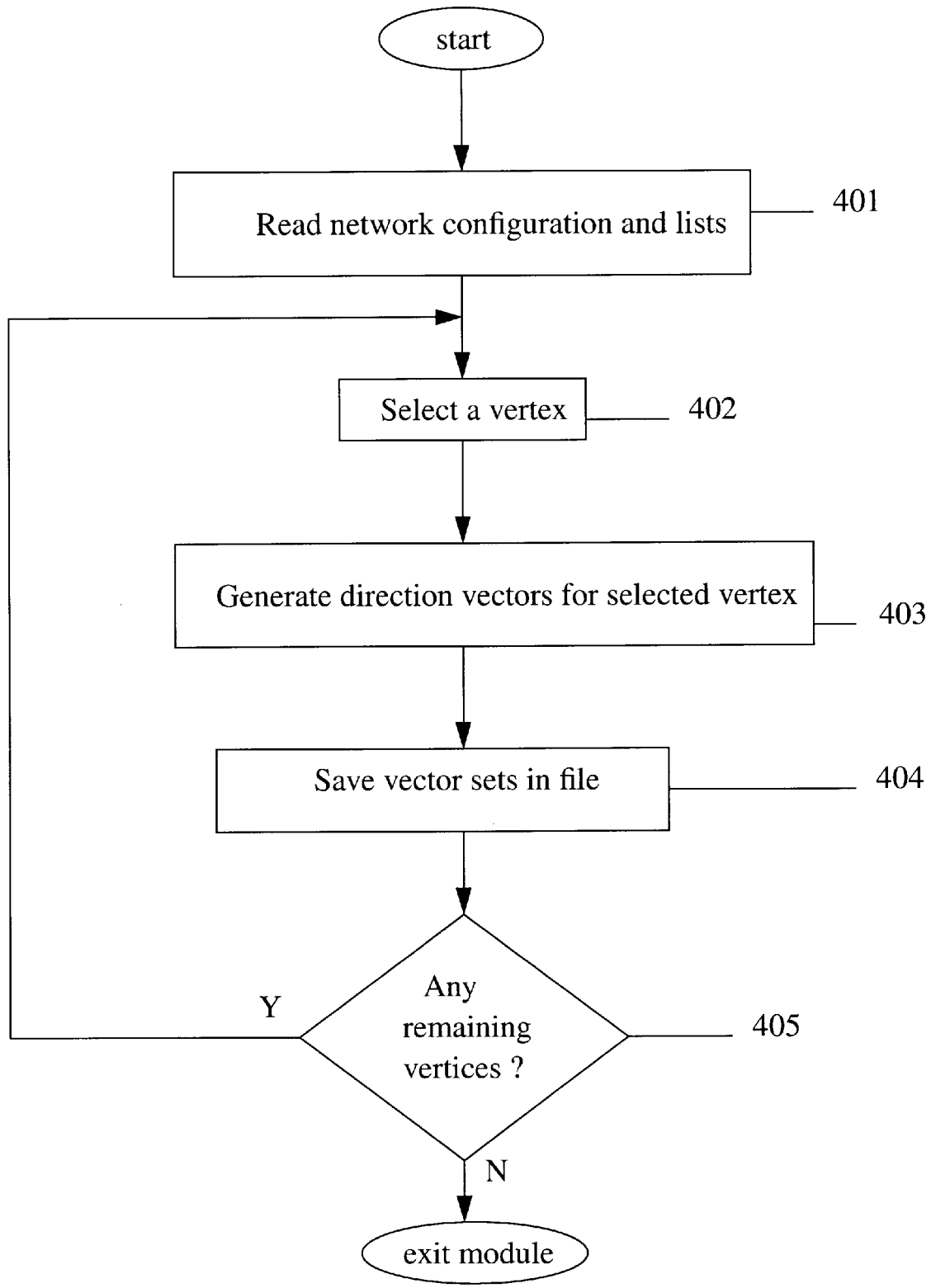
FIG. 4 is a flowchart of the direction vectors module.

FIG. 4 depicts the flowchart for the direction vectors module which generates the direction vectors associated with each of the eight possible surfaces. Each surface represents the eight possible directions corresponding to the three dimensional coordinates.

When a specific vertex is chosen to be the point of origin, then, in the two dimensional display, the corresponding set of direction vectors based on the vertex determines the method of relabelling or identification of the remaining vertices.

The network configuration, as defined in the quadrilateral and vertices lists generated and maintained by the quadrilateral generator and data points modules, is also used in conjunction with the set of direction vectors to complete the vertices labelling. Once the configuration lists are read 401 and a specific vertex is chosen 402, the module generates the direction vectors for each of the eight surfaces.

The direction vectors generation 403 is based on a set of pre-computed vectors that describe the eight possible surfaces based on the point of origin vertex. For example, the vectors generated from a three dimensional toroidal network are shown in Table 1. Once the surface number is calculated, the two dimensional display labels the neighboring vertices with the corresponding vector notations. The positive x direction is designated as the vertex at the three o'clock position and the remaining direction vectors are applied to the vertices in a counter-clockwise rotation.

TABLE 1

| Surface Number | Direction Vectors for Origin Point |
| --- | --- |
| 0 | x, z, y, -x, -z, -y |
| 1 | x, -y, z, -x, y, -z |
| 2 | x, y, -z, -x, -y, z |
| 3 | x, -z, -y, -x, z, y |
| 4 | x, y, z, -x, -y, -z |
| 5 | x, z, -y, -x, -z, y |
| 6 | x, -z, y, -x, z, -y |
| 7 | x, -y, -z, -x, y, z, |

The graphics programs uses these sets of vectors to label the nearest neighbor data points on the two dimensional display for any given point of origin vertex. The surface number is determined by taking the modulo 2 function of the three dimensional vertices indices (x,y,z) and combining the three indices into an octal number. The resultant is the surface number. For example, for vertex (2,7,1) chosen to be the point of origin, the modulo 2 function on each index yields (0,1,1). Taking these indices and forming an octal representation by making the x index the most significant and the z indice the least significant bit, the value becomes 011. The octal representation of 011 is 3, yielding surface number 3 from the table.

Once the surface number is determined, the nearest neighboring data points are labelled using the vectors associated with that surface. Starting with the nearest neighbor data point that is at the three o'clock position in the two dimensional diagram, that data point would represent the vertex in the positive x direction. So, if the vertex that is used as the point of origin has the coordinate (2,7,1), the data point in the three o'clock position would represent vertex (3,7,1). The labelling continues in a counter-clockwise manner, so that the next nearest neighbor data point would represent the vertex in the negative z position, (2,7,0).

Once the labelling of the initial point of origin vertex and its neighboring vertices is complete, the remaining vertices in the display are labelled. Since all vertices in the display are members of quadrilaterals, any remaining members of a quadrilateral can be labelled by the quadrilateral list. Based on the parallel properties of the quadrilateral, the direction vectors indicate the direction values of the vertices that have already been labelled.

Once the direction vector sets for each surface are generated, they are saved in a separate file 404. This procedure continues until all the vertices are associated with a direction vector set 405.

This method of a priori creating the direction vectors is an efficient means to map the vertices on the hyperbolic display. When a specific vertex is chosen to be centered in the graphics display, the remaining vertices can be determined by applying the set of direction vectors created by this algorithm.

Figure 5:
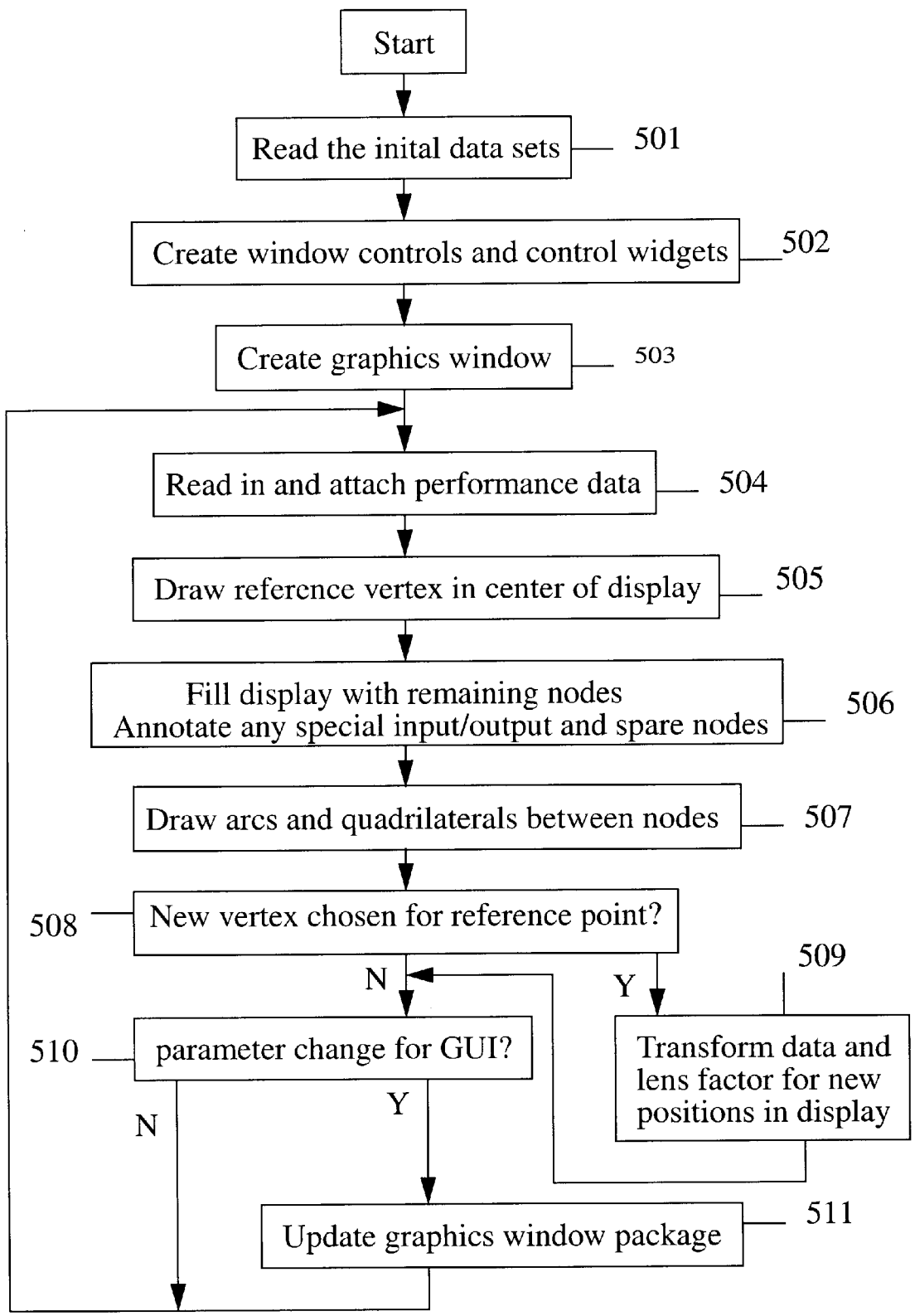
FIG. 5 is a flowchart of the real-time graphics display and Graphics User Interface (GUI) module of the system.

FIG. 5 depicts a flowchart of the Real-time Graphics and Graphical User Interface (GUI) module. This module dynamically draws the two dimensional hyperbolic plane, generates and interacts with the user via a GUI and mouse commands, and includes the drawing with vertices performance data.

The inputs to this module are read from the files generated in the quadrilateral generator module, data points module, and direction vectors module 501. These files contain the data of information about the quadrilaterals, vertices, direction vectors, node and arc geography lists, arc source and destination indices, and arc color.

Any computer that can draw a graphic images and can process user and file inputs can be used. This module creates the appropriate graphic controls window with the attendant window control widgets 502 and graphic window containing the hyperbolic disk display 503.

Once the graphics environment is running, this module continuously executes until a user exit command is entered. User commands are usually entered via keyboard or mouse.

The performance data can be read from a file 504 or generated real-time. This data is created by independent computer programs that continuously monitor the individual performance of each vertex of the three dimensional network and the results are put into a separate file. This data is converted to a graphical representation and displayed by a variable sized bar attached to each vertex. The size of the bar is a metric of a performance parameter associated with that vertex.

The next step is to draw the nodes and associated arcs on the two dimensional plane. First, the module places the reference data in the center of the graphics display 505. Then all nearest neighboring vertices are drawn on the disk using the data stored in files created from the data points module 506. With the data points, the nodes are labelled according to the eight direction vectors. In addition, this step annotates any special nodes such as input/output or spare nodes. The appropriate arcs are drawn on the display connecting the previously drawn nodes 507.

At any time during the execution of this module, changes can be made to the diagram by choosing a different vertex as the point of reference 508. If a change is made, then the appropriate data transformation will reflect the new node positions, labels, and performance bars 509.

In addition to the changes in the point of reference to the network, the user can also make changes to the parameters in the GUI display 510. Any changes will dynamically be updated and incorporated in the display at the next drawing cycle 511.

Figure 6:
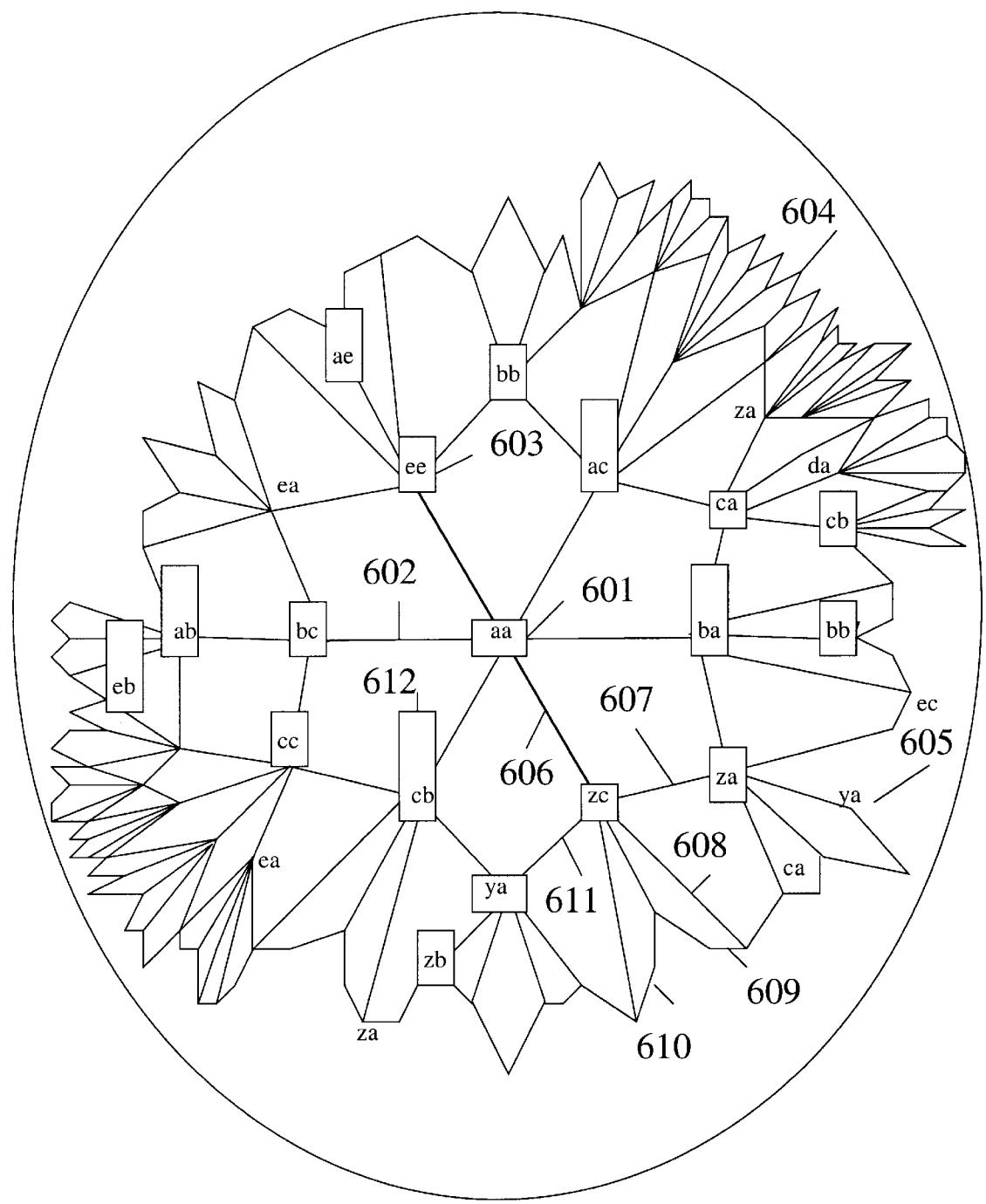
FIG. 6 is a depiction of a resulting computer screen with a two dimensional display without false crossings of a three dimensional interconnection network toroid.

FIG. 6 shows a two dimensional hyperbolic projection of a three dimensional toroid interconnection network without false crossings. For identification purposes, this figure only reflects a representative number of vertices and labels that would normally be displayed. The center data point 601 is the initial reference vertex. This data point is the node chosen by the user and will be used as the point of origin or reference. Arcs connecting the vertices constitute the actual links from those vertices to their nearest neighbors 602. Identification labels 603 are associated with all vertices for easy reference. To reduce possible confusion, vertices close to the edge of the diagram 604 are not labelled because of their close proximity. Also, many of these are duplicates of vertices already labelled. Vertex labels not contained within a box 605 indicate duplicates of previously labelled vertices.

Quadrilaterals associated with each of the vertices are also represented in the display. Each of the vertices has six adjacent quadrilaterals 606, 607, 608, 609, 610, 611.

In addition, to distinguish different performance criteria, the labels for each of the vertices can be represented as different sized boxes 612 and different shading.

The vertex that represents the reference data point can be changed by simply pointing out any other vertex in the two dimensional display and imputing the command, either via mouse or keyboard.

What is claimed is:

1. A method of displaying on a computer screen a two dimensional representation without any false crossings of a three dimensional interconnection network, where the three dimensional interconnection network consists of a plurality of vertices, where each of said plurality of vertices is represented by a coordinate, and where each of said plurality of vertices is physically linked to at least one other of said plurality of vertices, comprising the steps of
   (a) identifying a plurality of quadrilaterals in the three dimensional interconnection network, where each of said plurality of quadrilaterals is comprised of four of said plurality of vertices, and where each of said plurality of quadrilaterals is perpendicular with respect to each other of said plurality of quadrilaterals;
   (b) selecting one of said plurality of vertices as a reference data point, where the reference data point has cartesian coordinates $(x,y)=(0,0)$;
   (c) generating $w=x+(i*y)$, where $i=sqrt(-1)$;
   (d) evaluating the function at cartesian coordinates $(x,y)$, $$a(w)=(w*sqrt(2)-1)/(w-sqrt(2)),$$

where the result is the values $x_a$ and $y_a$, and where $(x_a,y_a)$ is a two dimensional coordinate;
   (e) evaluating the function at cartesian coordinates $(x,y)$, $$b(w)=(w*(1+i*sqrt(3))/2),$$

where the result is the values $x_b$ and $y_b$, and where $(x_b,y_b)$ is a two dimensional coordinate;
   (f) generating a plurality of nearest neighbor data points from the results of steps (c) through (e), where each of said plurality of nearest neighbor represents one of said plurality of vertices in the three dimensional interconnection network, and where one of said plurality of nearest neighbor data points has the coordinate $(x_a,y_a)$, and where each other of said plurality of data points has a coordinate that is a function of $(x_b,y_b)$ and $(x_a,y_a)$;
   (g) repeating the steps (c) through (e) for each of said plurality of vertices in each of said plurality of quadrilaterals, where each of said plurality of nearest neighbor data points generated in step (f) is used as said reference data point;
   (h) labelling each reference data point and each nearest neighbor data point; and
   (i) displaying a two dimensional display, where the two dimensional display consists of said reference data points and said plurality of nearest neighbor data points, and where said plurality of data points are connected with arcs, where said arcs reflect said physical links between said plurality of vertices comprising said plurality of quadrilaterals.

2. The method of claim 1, wherein said step of identifying a plurality of quadrilaterals in the three dimensional network comprising the steps of:
   (a) initializing a quadrilateral list, where the quadrilateral list is comprised of at least two of said plurality of quadrilaterals that are perpendicular to each other;
   (b) identifying one of said plurality of vertices in the three dimensional network as a point of reference;
   (c) selecting one of said plurality of vertices in the quadrilateral list;
   (d) determining if one of the vertices selected in step (c) is common with at least two of said plurality of quadrilaterals in said quadrilateral list;
   (e) determining, upon finding two of said plurality of quadrilaterals that have one of said plurality of vertices in common determined in step (d), if each of two said plurality of quadrilaterals are perpendicular with respect to each other;
   (f) generating additional quadrilaterals which contain the one of said plurality of vertices selected in step (d), and where each of said additional quadrilaterals is perpendicular to each other;
   (g) adding to the quadrilateral list any of the perpendicular quadrilaterals identified in steps (e) and (f) that are not already on the list; and
   (h) repeating the steps (c) through (g) for each of said plurality of quadrilaterals in the quadrilateral list.

3. The method of claim 2, wherein the step of determining, upon finding two of said plurality of quadrilaterals that have one of said plurality of vertices in common, if each of two said plurality of quadrilaterals are perpendicular with respect to each other is comprised of the steps of:
   (a) subtracting the coordinate of the vertex that is common to the two said plurality of quadrilaterals from the coordinate of the other vertex of the first of the said two plurality of quadrilaterals, where the minuend vertex is not common to the other of said two quadrilaterals;
   (b) subtracting the coordinate of the vertex that is common to the two said plurality of quadrilaterals from the coordinate of the other vertex of the second of the said two plurality of quadrilaterals, where the minuend vertex is not common to the other of said two quadrilaterals; and
   (c) computing the dot product of the subtractions in steps (a) and (b), noting that a zero result indicates said two plurality of quadrilaterals are perpendicular.

4. The method of claim 3, further comprising the steps of:
   (a) adding performance data for each of said plurality of reference data points and said plurality of nearest neighbor data points; and
   (b) generating a two dimensional display, where the two dimensional display consists of said reference data points and said plurality of nearest neighbor data points, and where said plurality of data points are connected with arcs, where said arcs reflect said physical links between said plurality of vertices comprising said quadrilateral list.

5. The method of claim 4, further comprising of the step of relabelling the plurality of data points of the two dimensional display upon a user choosing any of said plurality of vertices in the three dimensional interconnection network as the point of reference.

6. The method of claim 1, further comprising the step of adding performance data for each of said plurality of reference data points and said plurality of nearest neighbor data points.

7. The method of claim 1, further comprising of the step of relabelling the plurality of data points of the two dimensional display upon a user choosing any of said plurality of vertices in the three dimensional interconnection network as the point of reference.

\* \* \* \* \*